3,223,204
ADJUSTING MEANS FOR INTERNAL
SHOE DRUM BRAKES
Leslie Cyril Chouings, Leamington Spa, England, assignor to Automotive Products Company Limited, Leamington Spa, England
Filed Mar. 12, 1964, Ser. No. 351,310
Claims priority, application Great Britain, Mar. 13, 1963, 10,008/63
7 Claims. (Cl. 188—79.5)

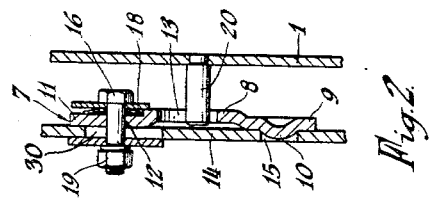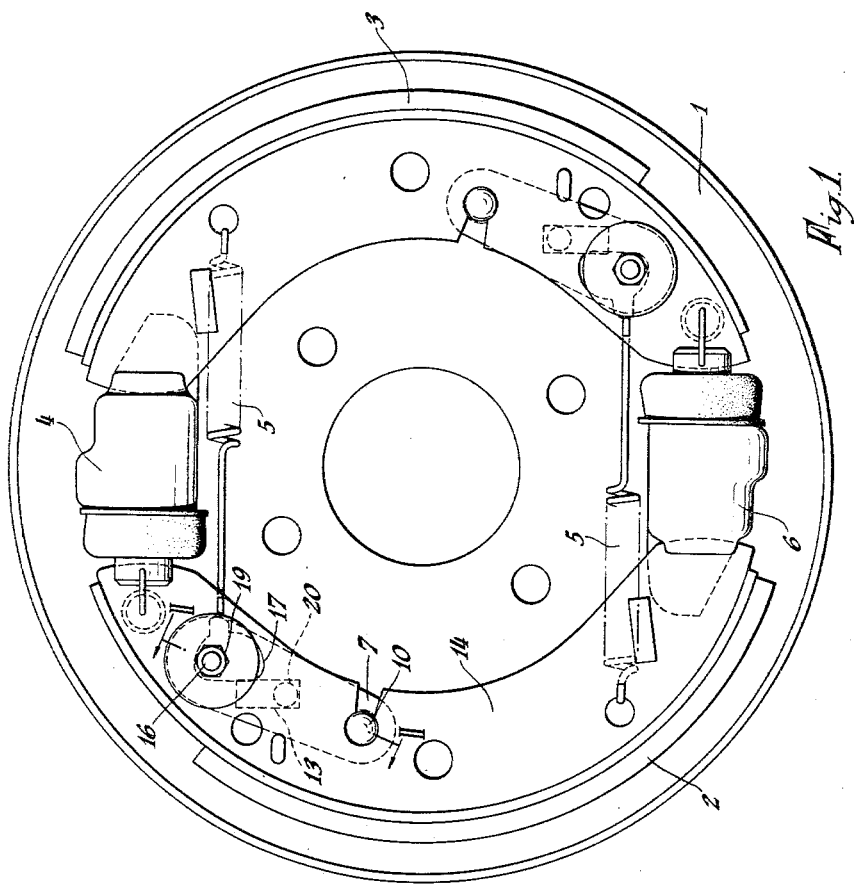

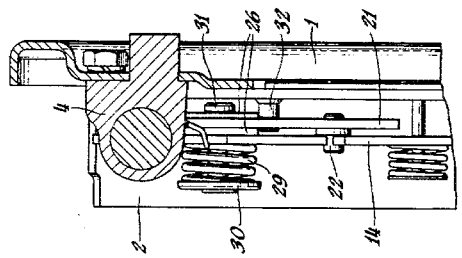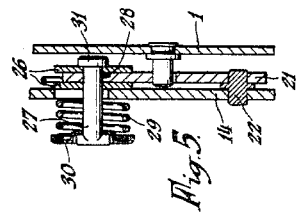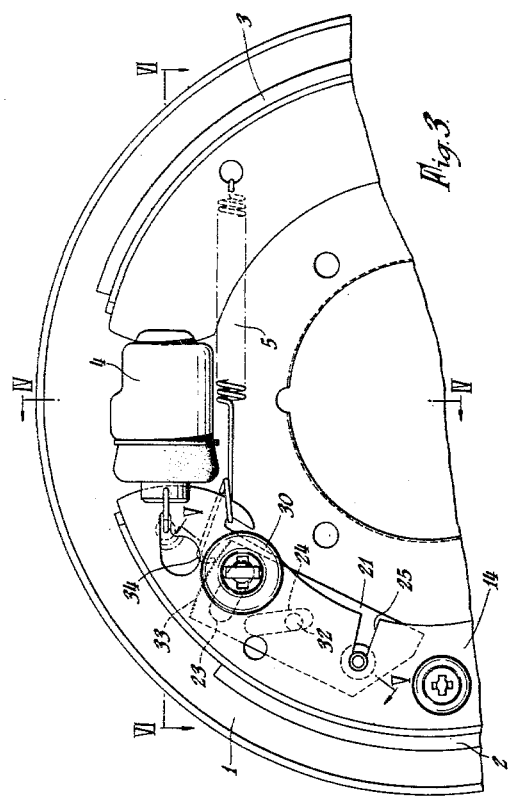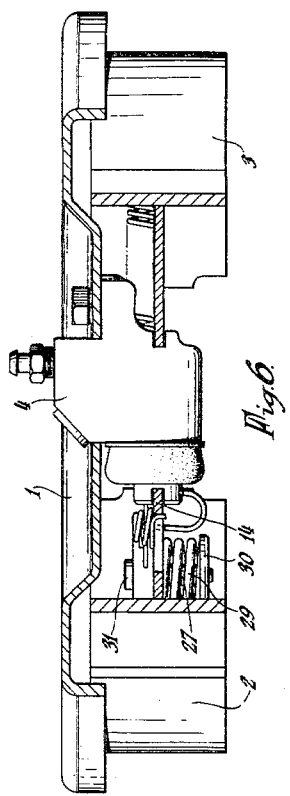
INVENTOR
Leslie C. Chouings
BY Winter & Tockman
ATTORNEYS United States Patent Office 3,223,204
Patented Dec. 14, 1965

This invention relates to adjusting means for internal shoe drum brakes and has for its object to provide adjusting means operable automatically upon actuation of the brake to effect adjustment of the brake shoes to compensate for wear of the brake shoe linings.

To this end according to the invention, automatic adjusting means for an internal shoe drum brake comprises a lever adapted to be pivotally mounted about one end on the web of a brake shoe so as to extend substantially in a circumferential direction and be capable of pivotal movement in a plane parallel to the plane of the brake shoe web, friction means adjacent the other end of the lever for holding the lever and brake shoe in relatively adjusted positions, and a fixed abutment carried by the brake back plate and operatively associated with the lever in such manner that during a brake application, movement of the brake shoe in excess of the normal travel and due to wear in the brake shoe lining results in pivotal movement of the lever by contact with the fixed abutment and in a direction causing the end of the lever in the region of the friction means to swing in a direction away from the lining of the brake shoe by an amount dependent on the excess movement of the brake shoe whereby the brake shoe is adjusted to compensate for the lining wear.

Embodiments of the invention will now be described by way of example with the aid of the accompanying drawings in which:

FIGURE 1 is a view of an internal shoe drum brake, the brake drum being removed, incorporating adjusting means according to one embodiment of the invention, FIGURE 2 is a section on the line II—II in FIGURE 1, FIGURE 3 is a view of part of an internal shoe drum brake, the brake drum being removed, incorporating adjusting means according to a second embodiment of the invention, FIGURE 4 is a section on the line IV—IV in FIGURE 3, FIGURE 5 is a section on the line V—V in FIGURE 3 and FIGURE 6 is a view on the line VI—VI in FIGURE 3.

Referring to the drawings the brake shown comprises generally a brake back plate 1 having two brake shoes 2 and 3 of conventional type assembled thereon. Brake shoe expanding mechanism indicated generally by reference numeral 4 and of any suitable kind, either fluid pressure operated or mechanically operated, is provided between one pair of adjacent ends of the brake shoes 2, 3, the expander means acting against the pull of the pull-off springs 5 extending between the brake shoes. Thrust means, indicated generally by reference numeral 6 are disposed between the other adjacent ends of the brake shoes, the thrust means being also of any suitable type.

In the embodiment of the invention shown in FIGURES 1 and 2 of the accompanying drawings, the lever 7 of the adjusting means, formed for example from sheet metal of suitable gauge, is joggled to provide a central portion 8 displaced out of the plane of the opposite end portions which extend in the same plane as one another. One of said end portions, the end portion 9, is punched from one face to provide a dimple 10 on the side of the lever opposite to that on which the central joggled portion is displaced. The other end portion 11 is provided with a bolt hole 12 the dimple and bolt hole being axially in alignment, and the central joggled portion has a rectangular slot 13 which extends at an angle to the axis between the dimple and bolt hole.

The lever is assembled on the web 14 of the brake shoe 2 with the dimple 10 locating in a hole 15 in the web 14 of the brake shoe, the opposite end of the lever being held in frictional engagement with the web of the brake shoe by coupling means comprising a nut 19 and bolt 16, the bolt shank passing through the bolt hole 12 in that end of the lever 7 and through an aperture 17 in the web of the brake shoe 2. A dished spring washer 18 such as a Belleville washer, is interposed between the head of bolt 16 and the lever, the spring washer being compressed when the nut 19 is screwed down on the bolt to clamp the appropriate end of the lever 7 in frictional engagement with the shoe web. A washer 30 is mounted on bolt 16 between the nut 19 and web 14. The hole 15 in the web to receive the dimple 10 of the lever 7 and the aperture 17 in the web are arranged so that the lever extends substantially in the circumferential direction of the brake shoe.

The brake back plate 1 is provided with a dowel pin 20 which projects outwardly at right angles to the plane of the back plate from the inner face thereof. The dowel pin 20 is positioned on the back plate 1 so that the outer end thereof engages in the slot 13 in the lever 7 when the brake shoe is assembled on the brake back plate. The diameter of the dowel pin 20 is smaller than the width of the slot 13 by an amount corresponding to the predetermined or normal movement of the brake shoe with an unworn lining so that normally upon movement of the brake shoe by actuation of the brake expander mechanism 4, the lever and shoe move jointly. If the however, wear has occurred in the linings sufficient to cause excess movement of the brake shoe, the trailing edge of the slot 13 in the lever 7 will contact the dowel pin 20 so that during any such excess movement the lever 7 will be caused to pivot on the brake shoe web about the dimple 10, the frictional engagement being overcome whereby the position of the end of the lever 1 in frictional engagement with the brake shoe web will be changed, the brake shoe and lever remaining in the relatively adjusted positions when the brake is released.

In the second embodiment of the invention shown in FIGURES 3 to 6 of the drawings the friction means is arranged to act on the lever of the adjusting means instead of between the lever and web of the shoe as in the form of the invention above described.

According to this embodiment of the invention, the lever 21 of the adjusting means is flat and is provided adjacent one end with a pivot pin 22 which projects outwardly from one side of the lever 21 at right angles to the plane of the lever. Adjacent the other end, the lever 21 is provided with an arcuate slot 23 which extends transversely and concentric to the axis of the pivot pin 22. The lever 21 is also provided with a rectangular slot 24 which is disposed between the pivot pin 22 and arcuate slot 23, the rectangular slot 24 extending at an angle to an axis between the pivot pin and arcuate slot.

The lever 21 is assembled on the web 14 of a brake shoe so as to be between the web and the brake back plate, the pivot pin 22 extending into a hole 25 provided in the brake shoe web. A pair of discs 26 of friction material, metal or other suitable material is provided at the end of the lever in the region of the arcuate slot 23, said discs being arranged one on either side of the lever. Each disc is provided centrally with a hole to receive a retaining pin 27, the shank of which passes through the discs, the arcuate slot 23 in the lever, and a hole 28 provided in the web of the brake shoe. Spring loading acting through the retaining pin holds the discs in frictional engagement with the lever, the spring loading being provided by a compression spring 29 which surrounds the end of the retaining pin 27 projecting through the brake shoe web one end of the spring bearing against the brake shoe web the opposite end bearing against a spring cup 30 secured to the end of the retaining pin, the other end of the retaining pin having an enlarged head 31 which bears against the appropriate friction disc.

The brake back plate 1 is provided with a dowel pin 32 which projects outwardly at right angles to the plane of the back plate from the inner face thereof. The dowel pin is positioned on the back plate so that the outer end thereof engages in the rectangular slot 24 in the lever 21 when the brake shoe is assembled on the brake back plate. The diameter of the dowel pin 32 is smaller than the width of the rectangular slot 24 by an amount corresponding to the predetermined or normal movement of the brake shoe with an unworn lining so that normally upon movement of the brake shoe by actuation of the brake expander mechanism, the lever and shoe move jointly. If however, wear has occurred in the linings sufficient to cause excess movement of the brake shoe the trailing edge of the slot 24 in the lever will contact the dowel pin 32 so that during any such excess movement the lever 21 will be caused to pivot about the pivot pin 22 on the brake shoe web, the frictional engagement being overcome whereby the position of the end of the lever in frictional engagement with the friction discs will be changed, the brake shoe and lever remaining in the relatively adjusted positions when the brake is released. At this time, the pin 31 will slide along the arcuate slot 23, shown in FIG. 3.

Advantageously, means are provided for holding the lever 21 positively in the adjusted position. Such means as shown in FIGURE 3 of the drawings, consists of a ratchet and pawl mechanism associated with the lever 21, the ratchet consisting of serrations 33 provided on the end of the lever 21 adjacent the arcuate slot 23, the pawl 34 being formed integral with one of the brake shoe pull-off springs 5 and formed by suitably bending one end of said spring so that it is engageable with the serrations 33 of the lever.

I claim:

1. An automatic adjusting device for a brake comprising a brake plate, a brake web with a brake shoe carried by said plate, reciprocating means for moving said web and shoe in one direction during a braking operation, retraction means for retracting said web and shoe when releasing a braking action, a brake shoe adjustment lever extending circumferentially of said web, one end of said lever being pivotally connected to said web, friction means disposed adjacent said lever, including a dished washer mounted on a bolt extending through said web and lever, to maintain the opposite lever end in frictional engagement with said web, said lever being disposed on one side only of said web and between said web and back plate, said friction means and said lever being two separate members, slot means in said lever, a pin fixed on said back plate and extending into said slot means only, the width of said slot means being of substantially larger dimension than the diameter of said pin to permit swinging pivotal movement of said lever to adjust for excessive movement of said brake shoe due to wear and said web having a hole therein adjacent the opposite lever end and a dimple disposed in said hole.

2. An automatic adjusting device for a brake comprising a brake plate, a brake web with a brake shoe carried by said plate, reciprocating means for moving said web and shoe in one direction during a braking operation, retraction means for retracting said web and shoe when releasing a braking action, a brake shoe adjustment lever extending circumferentially of said web, one end of said lever being pivotally connected to said web, friction means including a coiled spring mounted on a bolt extending through said web and lever, said coiled spring being disposed on said web opposite the side on which said lever is located, to maintain the opposite lever end in frictional engagement with said web, said lever being disposed on one side only of said web and between said web and back plate, said friction means and said lever being two separate members, slot means in said lever, a pin fixed on said back plate and extending into said slot means only, the width of said slot means being of substantially larger dimension than the diameter of said pin to permit swinging pivotal movement of said lever to adjust for excessive movement of said brake shoe due to wear, and said web having a hole therein adjacent the opposite lever end and a pivot pin disposed in said hole.

3. The adjusting device of claim 1 wherein an elongated slot is disposed in said web adjacent said hole and extends into one side of said hole.

4. The adjusting device of claim 1 wherein said slot means is elongated and arcuate.

5. An automatic adjusting device for a brake comprising a brake plate, a brake web with a brake shoe carried by said plate, reciprocating means for moving said web and shoe in one direction during a braking operation, retraction means for retracting said web and shoe when releasing a braking action, a brake shoe adjustment lever extending circumferentially of said web, a bolt member extending through said web and one end of said lever, a dished washer on said bolt member for maintaining said lever in frictional engagement against said web, said lever and washer being disposed on one side only of said web between said web and back plate, said lever having a central offset portion and an opposite end provided with a dimple, said web having an aperture into which said dimple projects and seats, a pin fixed on said back plate, slot means in said lever being of substantially greater width than said pin, said pin having an end extending through said slot means, whereby said lever is pivotally swingable with respect to said web to adjust for excessive movement of said brake shoe due to wear.

6. An automatic adjusting device for a brake comprising a brake plate, a brake web with a brake shoe carried by said plate, reciprocating means for moving said web and shoe in one direction during a braking operation, retraction means for retracting said web and shoe when releasing a braking action, a brake shoe adjustment lever having an elongated slot adjacent one end extending circumferentially of said web, a bolt member extending through said web and said slot, a pair of friction discs mounted on said bolt member, said lever being disposed between said discs, a spring member mounted on said bolt member for maintaining said lever and web in frictional engagement with each other, said lever being disposed on one side of said web only between said web and back plate, a pin pivotally connecting the opposite lever end to said web, said lever having a rectangular slot between its ends, an abutment pin fixed to said plate and extending into said rectangular slot, said rectangular slot having a width substantially greater than the diameter of said rectangular slot, to cause the end of the lever adjacent said arcuate slot and said bolt member to slide in said arcuate slot upon excessive wear of the brake shoe.

7. The device of claim 6 wherein ratchet and pawl means are provided for holding the lever in an adjusted position.

References Cited by the Examiner

UNITED STATES PATENTS 1,939,584  12/1933  White _____ 188—196 X
2,018,567  10/1935  Page _____ 188—79.5

FOREIGN PATENTS 914,198  6/1946  France.
885,631  8/1953  Germany.

MILTON BUCHLER, *Primary Examiner.*
DUANE A. REGER, *Examiner.*